UNITED STATES PATENT OFFICE.

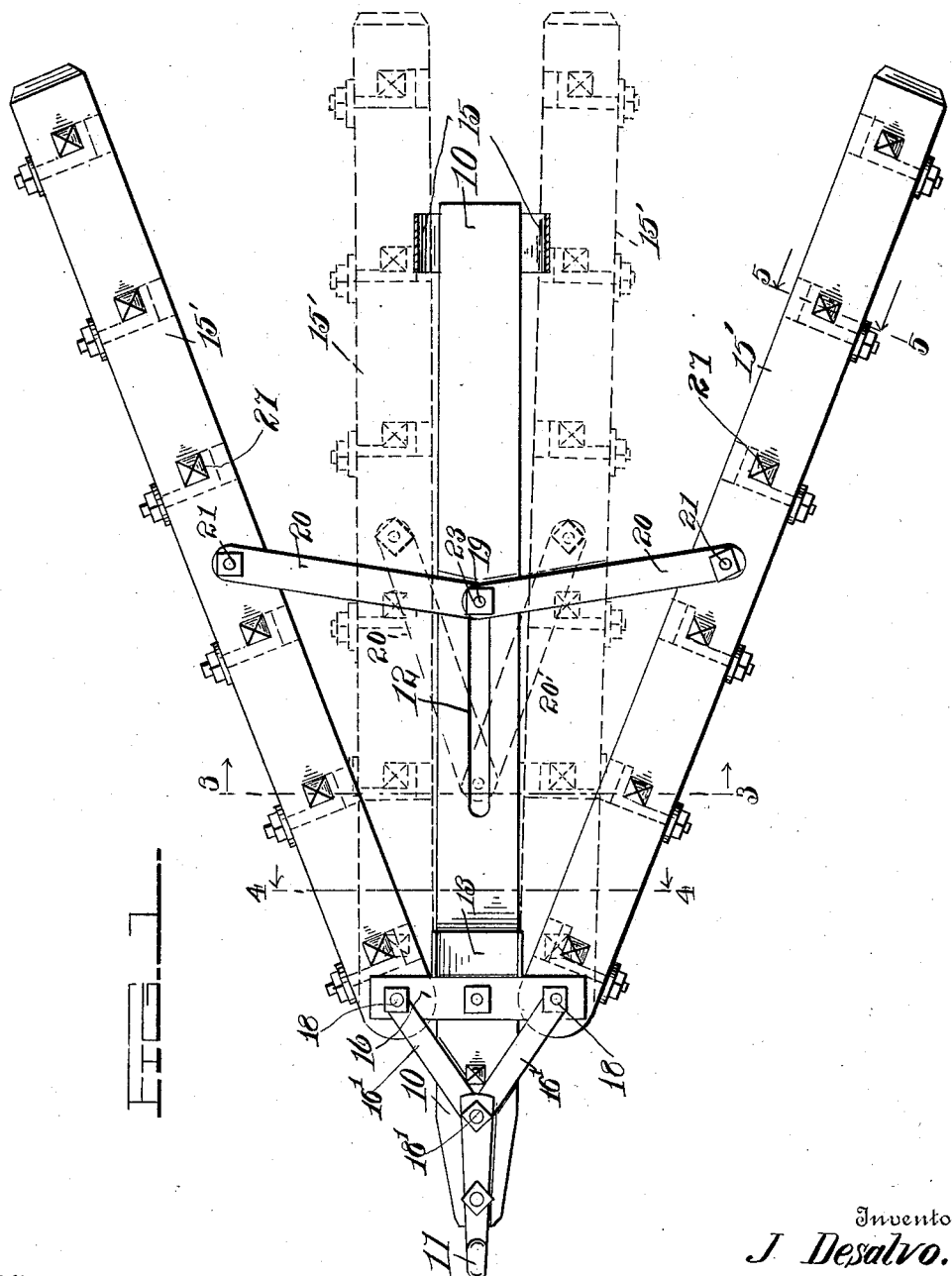

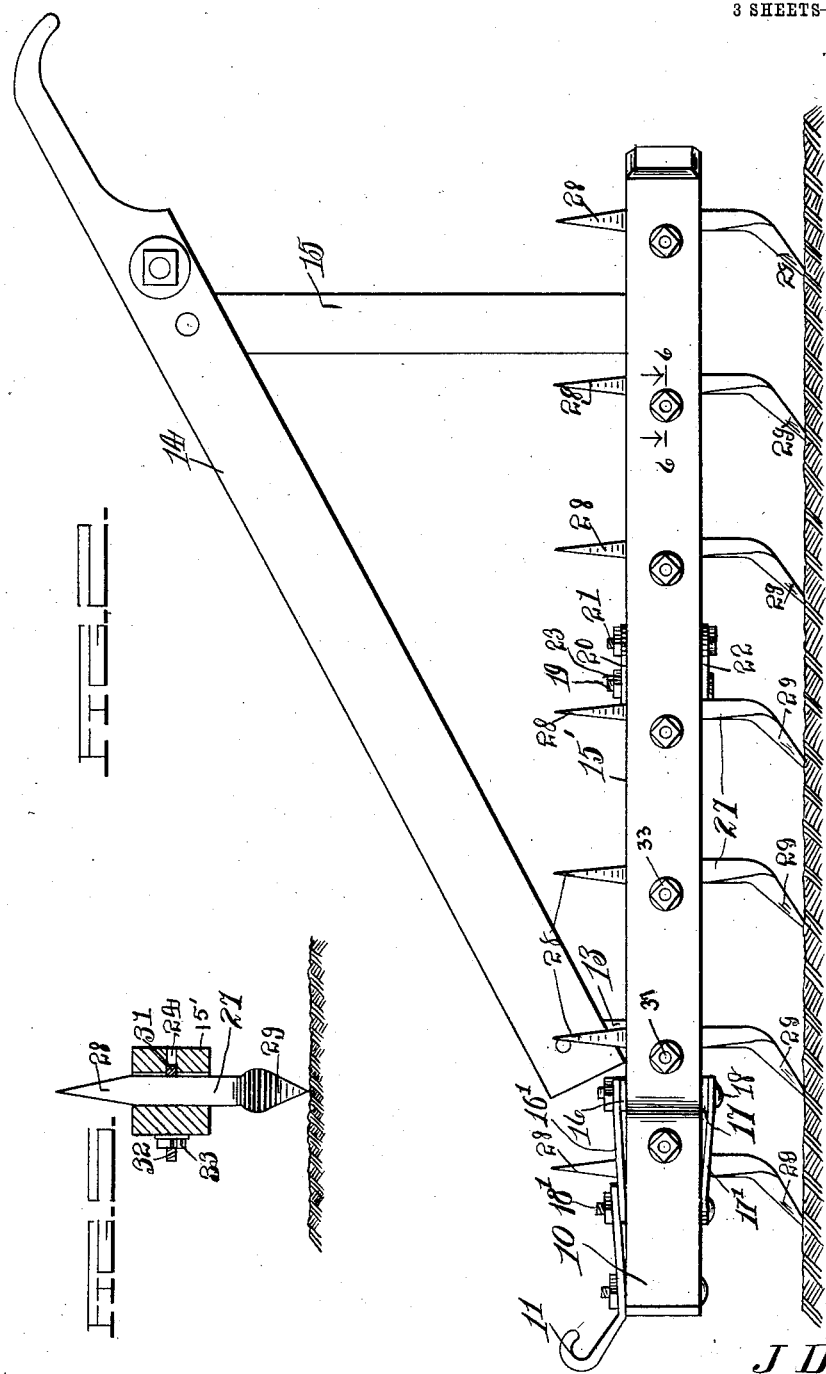

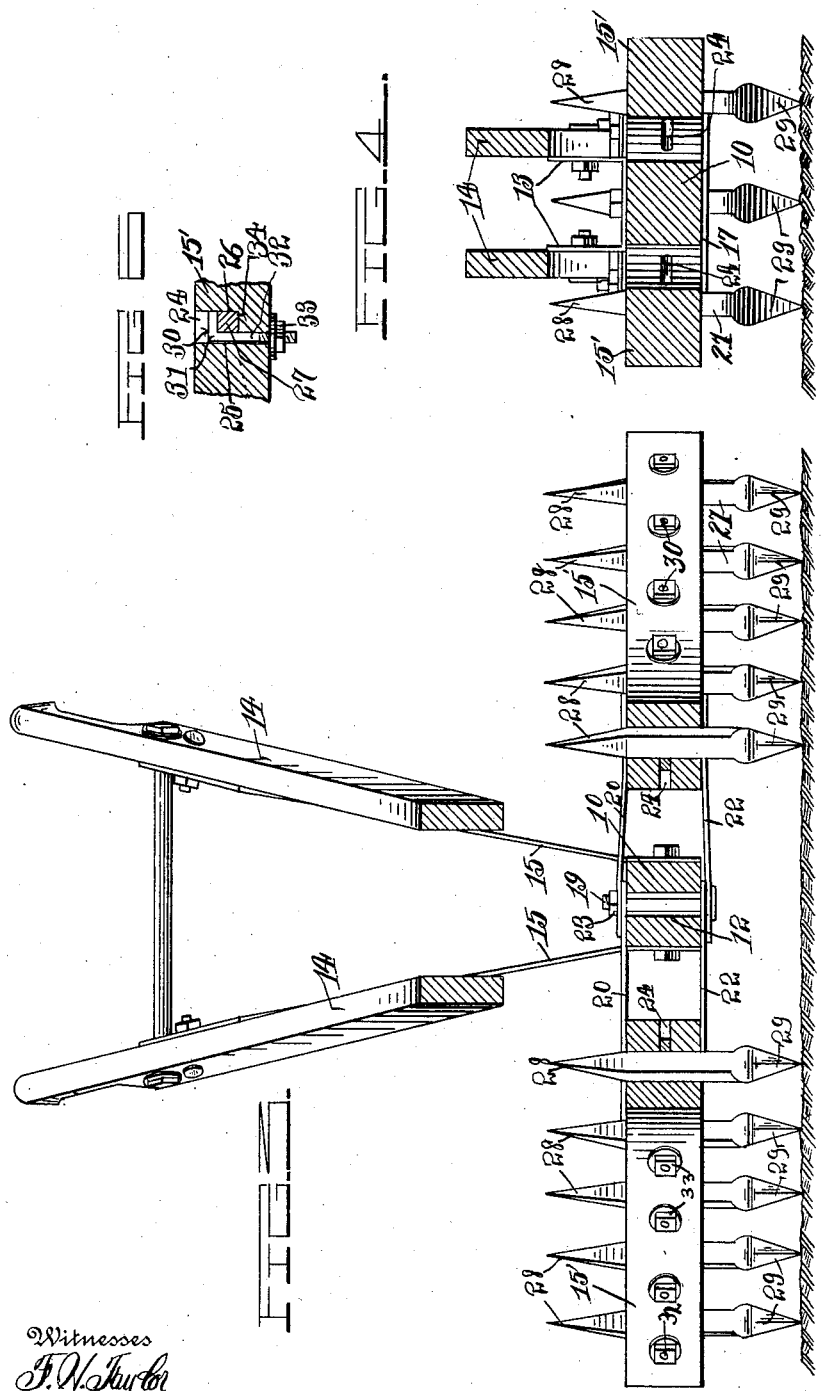

JOE DESALVO, OF CENTER RIDGE, ARKANSAS.

ADJUSTABLE HARROW.

1,049,683.   Specification of Letters Patent.   Patented Jan. 7, 1913.

Application filed September 9, 1910. Serial No. 581,215.

*To all whom it may concern:*

Be it known that I, JOE DESALVO, a citizen of the United States, residing at Center Ridge, in the county of Conway, State of Arkansas, have invented certain new and useful Improvements in Adjustable Harrows; and I do hereby declare the following to be a full, clear, and exact description of the invention, such as will enable others skilled in the art to which is appertains to make and use the same.

This invention relates to certain novel and useful improvements in harrows and has particular application to means for adjusting the tooth carrying beam of the harrow.

In the present instance it is my purpose to provide an adjustable harrow which will embody the desired features of simplicity, strength, efficiency and durability.

With the above recited objects and others of a similar nature in view, my invention consists in the construction, combination and arrangement of parts set forth in and falling within the scope of the appended claim.

In the accompanying drawings, forming part of this specification:—Figure 1 is a plan view of the harrow with the handles removed. Fig. 2 is a side elevation of the harrow. Fig. 3 is a cross section taken on the line 3—3, Fig. 1. Fig. 4 is a cross section taken on the line 4—4, Fig. 1. Fig. 5 is a cross section taken on the line 5—5, Fig. 1. Fig. 6 is a fragmentary sectional view taken on the line 6—6, Fig. 2.

Referring now to the drawings, the harrow is seen to comprise a draft beam 10 preferably formed rectangular in cross section and being equipped at its forward end with a draft hook 11. The beam is provided longitudinally with a slot 12 which forms means for directing the sliding movements of the harrow tooth bar hereinafter described and is further equipped adjacent its leading end with a U-shaped strap 13, to the legs of which are fixed the forward ends of inclined handles 14. The rear ends of the handles are connected to the rear end of the beam by means of inclined strap braces 15; thus the handles are anchored to the draft beam and are not affected by any movement of the hereinafter described harrow tooth beams.

The harrow tooth beams 15' are each approximately the same in length as the draft beam and are preferably rectangular in cross section. Each harrow beam is pivotally secured at its leading end to the draft beam adjacent the leading end of the latter, the preferred manner of pivotally securing the beams being to mount upon the top and bottom faces of the draft beam a pair of cross straps 16 and 17. I also provide the upper and lower pairs of link straps 16' and 17', the forward ends of which are connected with the draft attachment and the forward end of the main or draft beam by means of the vertically disposed bolt 18', while the rear spaced ends of the link straps over-lie the projecting end portions of the cross straps. Vertically disposed bolts 18 pass through the cross straps, the rear ends of the link straps and the harrow beams in such a manner that the beams are free to swing outwardly from the draft beam.

For locking the harrow tooth beams in any desired position relatively to the draft beam, a bolt 19 is mounted for sliding movement in the slot 12 of the draft beam, the shank of this bolt projecting considerably beyond the top and bottom faces of the beam and arranged upon that portion of the bolt shank which projects above the top face of the draft beam is a pair of links 20, the outer ends of these links being pivotally secured to the top faces of the harrow tooth beams, as shown at 21. Arranged upon that portion of the bolt shank which projects below the bottom face of the draft beam is a pair of links 22, the outer ends of these links being pivotally secured to the bottom faces of the harrow tooth beams. By sliding the bolt 19 longitudinally in the slot 12, the free ends of the harrow tooth beams are swung outwardly or inwardly according to the direction of movement of the bolt and when it is desired to lock the device against movement, the retaining nut 23 of the bolt is advanced tightly up against the underlying ends of the uppermost links 20, whereby the links are forced to bind against the draft beam and prevent further movement of the harrow tooth beams.

Arranged in the inner face of each harrow tooth beam is a plurality of alined rabbets 24, each rabbet being formed with a circular extension 25 which is arranged adjacent to one end of the rabbet. Each beam is further equipped with a plurality of approximately square openings 26 which open through the top and bottom faces of the beam and register with the intermediate portion of the rabbets as shown in Fig. 6. Mounted for vertical movement in each opening or seat 26 is a harrow tooth 27, the same having an approximately square shank sharpened at its upper end as shown at 28 and provided at its lower end with a shovel point 29.

For locking the harrow teeth in position, a hook 30 is mounted in each rabbet 24, each hook comprising an approximately straight bill 31 which is nearly the same in length and width as the rabbet, and a threaded straight shank 32 which extends through the extension 25 of the rabbet and is equipped with a retaining nut 33 which bears against the outer face of the harrow tooth beam. It is clear that by advancing the retaining nut 33, the bill of the hook may be engaged with one side of the harrow tooth and by further advancement of the nut, the bill may be caused to force the harrow tooth into tight frictional engagement with one wall 34 of its seat. By retracting the retaining nut, the bill of the hook will be loosened from engagement with the harrow tooth so that the latter may be bodily removed from its seat and replaced so that either its pointed end or shoveled end will be brought into contact with the ground. The bill of the hook being approximately the same size as the rabbet will be prevented against rotation during the rotation of the retaining nut.

What I claim is:—

In a harrow, the combination with a main beam having a vertical longitudinal slot formed centrally therein, of a U-shaped strap connected to the forward end of the beam, inclined handles connected at their forward ends to the U-shaped strap, brace members connecting the rear ends of the handles to the main beam, cross straps connected to the upper and lower faces of the forward end of the beam, a draft attachment for such forward end of the beam, link members extending between the draft attachment and the ends of the cross straps, a pair of movable tooth carrying beams one on each side of the main beam, bolts passing through the links, cross straps and the forward ends of the tooth carrying beams whereby the latter are connected to the main beam, teeth carried by the tooth carrying beam and a pair of links having their outer ends pivotally connected to the top faces of the tooth carrying beam, the inner or meeting ends of said links lying above the longitudinal slots in the main beam, and a bolt passing through the slotted portion of the main beam and the meeting ends of the links and adapted to be operated to hold the tooth carrying beam in adjusted position relative to the main beam.

In testimony whereof, I affix my signature, in presence of two witnesses.

JOE DESALVO.

Witnesses:
 ARRIE HENLEY,
 S. L. HENLEY.

Copies of this patent may be obtained for five cents each, by addressing the "Commissioner of Patents, Washington, D. C."